US012650831B2

(12) United States Patent
Wakita

(10) Patent No.: US 12,650,831 B2
(45) Date of Patent: Jun. 9, 2026

(54) COMMUNICATION APPARATUS, CONTROL METHOD OF COMMUNICATION APPARATUS, AND STORAGE MEDIUM

(71) Applicant: CANON KABUSHIKI KAISHA, Tokyo (JP)

(72) Inventor: Ryuhei Wakita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 208 days.

(21) Appl. No.: 18/624,004

(22) Filed: Apr. 1, 2024

(65) Prior Publication Data

US 2024/0338199 A1      Oct. 10, 2024

(30) Foreign Application Priority Data

Apr. 5, 2023      (JP) ................................. 2023-061749

(51) Int. Cl.
*G06F 8/65*            (2018.01)
*G06F 8/654*          (2018.01)

(52) U.S. Cl.
CPC ...................................... *G06F 8/65* (2013.01)

(58) Field of Classification Search
CPC ................................... G06F 8/65; G06F 8/654
See application file for complete search history.

(56) References Cited

U.S. PATENT DOCUMENTS

| | | | | | |
|---|---|---|---|---|---|
| 10,534,568 B2 * | 1/2020 | Han | ...................... | G06F 3/1225 |
| 2003/0112461 A1 * | 6/2003 | Ogura | ...................... | G06F 8/65 |
| | | | | 358/1.15 |

| | | | | | |
|---|---|---|---|---|---|
| 2004/0181787 A1 * | 9/2004 | Wickham | ................... | G06F 8/65 |
| | | | | 715/255 |
| 2004/0187103 A1 * | 9/2004 | Wickham | ................... | G06F 8/65 |
| | | | | 717/174 |
| 2005/0257215 A1 * | 11/2005 | Denby | ...................... | G06F 8/65 |
| | | | | 717/172 |
| 2012/0124568 A1 * | 5/2012 | Fallon | ...................... | G06F 9/453 |
| | | | | 717/169 |
| 2014/0047425 A1 * | 2/2014 | Thapar | ...................... | G06F 8/65 |
| | | | | 717/168 |
| 2014/0223424 A1 * | 8/2014 | Han | ........................... | G06F 8/60 |
| | | | | 717/173 |
| 2020/0174772 A1 * | 6/2020 | Madala | ..................... | G06F 8/65 |
| 2020/0372157 A1 * | 11/2020 | Singer | ................. | G06F 11/0793 |
| 2021/0132938 A1 * | 5/2021 | Ogura | ...................... | G06F 8/65 |
| 2022/0027138 A1 * | 1/2022 | Stevens | ..................... | G06F 8/65 |
| 2022/0261236 A1 | 8/2022 | Ogawa | .................... | G06F 8/656 |
| 2023/0418591 A1 * | 12/2023 | Lim | ....................... | G06F 9/4401 |
| 2024/0256257 A1 | 8/2024 | Sasaki et al. | ............. | G06F 8/65 |

FOREIGN PATENT DOCUMENTS

JP            2022-125869            8/2022

* cited by examiner

*Primary Examiner* — Darren B Schwartz
(74) *Attorney, Agent, or Firm* — Venable LLP

(57)            ABSTRACT

Provided is a communication apparatus that is capable of communicating with a server and that includes: a display control unit configured to display a confirmation screen for receiving an operation on whether update of firmware of the communication apparatus is to be executed or not, on a display unit; and an execution unit configured to execute the update of the firmware of the communication apparatus by using firmware data that is used to update the firmware and that is provided from the server, in a case where a predetermined time elapses from display of the confirmation screen by the display control unit without reception of an instruction of the update of the firmware by a user.

10 Claims, 13 Drawing Sheets

THERE IS LATEST FIRMWARE FOR YOUR PRINTER
DO YOU WANT TO EXECUTE FIRMWARE UPDATE
OF PRINTER?

| NO | YES |
|----|-----|

FIG.4

REGULARLY CHECK PRESENCE OF LATEST FIRMWARE
WITH SERVER AND DISPLAY NOTIFICATION SCREEN?

| YES | NO |

FIG.6

PLEASE SET TIMING OF NOTIFICATION

| DURING STANDBY | IN POWER-OFF |

FIG.7

FIRMWARE IS UPDATED.
PLEASE PRESS "OK".

UPDATE MAY BE UNINTENDED FIRMWARE UPDATE.
DO YOU WANT TO RESTORE FIRMWARE OF PRINTER
TO ORIGINAL VERSION?

| NO | YES |

FIG.11

COMMUNICATION APPARATUS, CONTROL METHOD OF COMMUNICATION APPARATUS, AND STORAGE MEDIUM

BACKGROUND

Field of the Invention

The present disclosure relates to a communication apparatus, a control method of the communication apparatus, and a program.

Description of the Related Art

There is a case where a printer capable of communicating with a server via a network obtains update data of the printer from the server, and displays the fact that firmware update is possible to the user to guide the user to the firmware update. In such a case, the user recognizes this guidance display, and executes the firmware update. However, there is a case where the user does not recognize this guidance display screen, and neglects the guidance without performing an operation. Neglecting the guidance without performing an operation results in a loss of an opportunity of firmware update.

Japanese Patent Laid-Open No. 2022-125869 describes a technique as follows. Even in the case where a user does not recognize guidance display of firmware update and neglects the guidance for a certain time and power is turned off, the guidance display of firmware update is performed again in the next power-on to prompt the user to perform the firmware update.

SUMMARY

However, in Japanese Patent Laid-Open No. 2022-125869, even if the guidance display of the firmware update is performed again, the firmware update is not executed unless the user performs an operation of executing the firmware update, and there is a possibility that the opportunity of the firmware update is lost.

A communication apparatus according to one aspect of the present disclosure is a communication apparatus capable of communicating with a server, and includes: a display control unit configured to display a confirmation screen for receiving an operation on whether update of firmware of the communication apparatus is to be executed or not, on a display unit; and an execution unit configured to execute the update of the firmware of the communication apparatus by using firmware data that is used to update the firmware and that is provided from the server, in a case where a predetermined time elapses from display of the confirmation screen by the display control unit without reception of an instruction of the update of the firmware by a user.

Further features of the present invention will become apparent from the following description of exemplary embodiments with reference to the attached drawings.

BRIEF DESCRIPTION OF THE DRAWINGS

FIG. 4 is a diagram illustrating a user interface screen;

FIG. 6 is a diagram illustrating a user interface screen;

FIG. 7 is a diagram illustrating a user interface screen;

FIG. 10 is a diagram illustrating a user interface screen;

FIG. 11 is a diagram illustrating a user interface screen;

DESCRIPTION OF THE EMBODIMENTS

Preferable embodiments of the present invention are explained below in detail with reference to the attached drawings. Note that the following embodiments do not limit the present invention according to the scope of claims, and not all of the combinations of features explained in the embodiments are necessarily essential for the solving means of the present invention.

Embodiment 1

Figure 1:
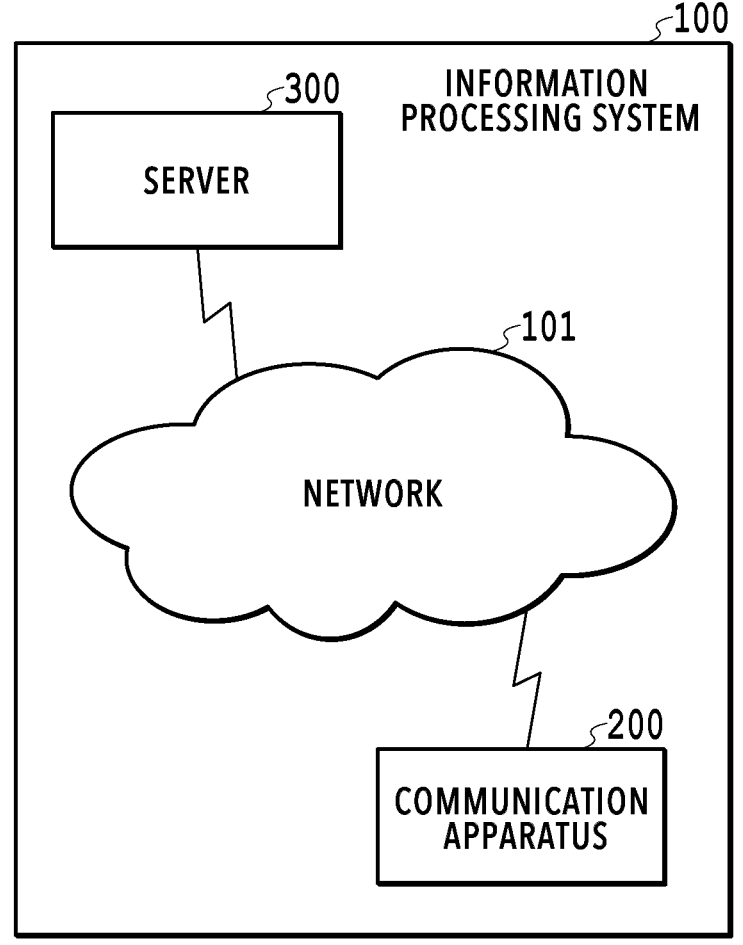
FIG. 1 is a block diagram illustrating an information processing system.

FIG. 1 is a diagram illustrating an example of a configuration of an information processing system 100 in the present embodiment. The information processing system 100 includes a network 101, a communication apparatus 200 that communicates via the network 101, and a server 300. Although a printer is described as an example of the communication apparatus 200 in the present embodiment, the communication apparatus 200 is not limited to the printer, and various apparatuses are applicable as the communication apparatus 200 as long as it is an apparatus capable of communicating with the server 300. For example, in the case of the printer, an ink-jet printer, a full-color laser beam printer, a monochrome printer, and the like are applicable. Moreover, in addition to the printer, an information processing apparatus, a copier, a facsimile apparatus, a mobile terminal, a smartphone, a laptop computer, a tablet terminal, a PDA, a digital camera, an audio reproducing device, a television set, and the like are applicable. Furthermore, a multifunction printer (MFP) having multiple functions such as a copy function, a FAX function, and a printing function is applicable. The server 300 and the communication apparatus 200 can be connected to each other via a communication network. Note that the communication network may be any of a network using wireless communication, a network using wired communication, or a network including both of the above-mentioned networks.

Figure 2:
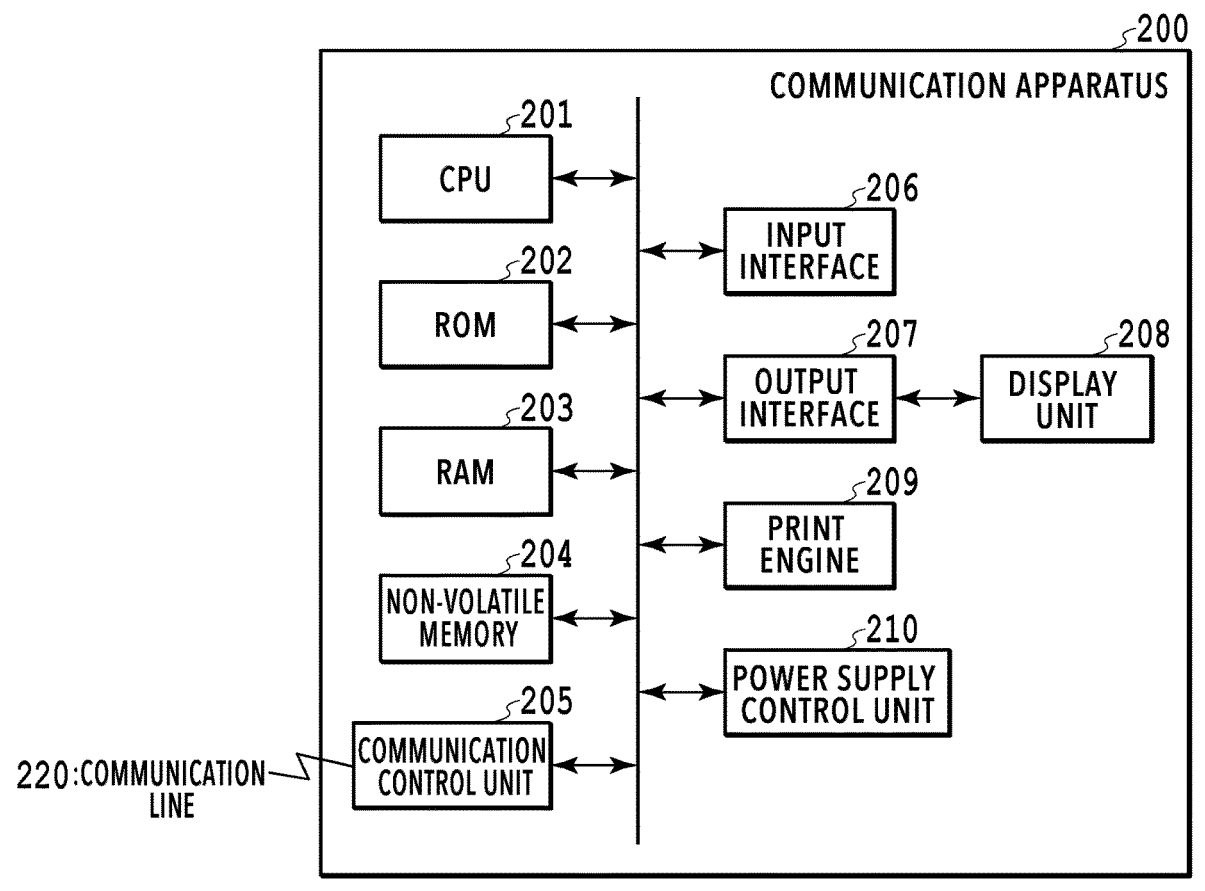
FIG. 2 is a block diagram illustrating a configuration of a communication apparatus.

FIG. 2 is a block diagram illustrating an example of a configuration of the communication apparatus 200. The communication apparatus 200 includes a CPU 201, a ROM 202, a RAM 203, a non-volatile memory 204, a communication control unit 205, an input interface 206, an output interface 207, a display unit 208, a print engine 209, and a power supply control unit 210. The communication control unit 205 connects to a communication network to connect to an Internet provider or to perform communication of data and the like with the server 300. Note that, for example, a protocol such as HTTP or XMPP is used for the connection to the communication network. The RAM 203 is formed of a dynamic random access memory (DRAM) that requires a backup power supply. Note that, since the RAM 203 holds data by being supplied with power (not illustrated) for data backup, data such as program control variables can be stored without being volatile. Moreover, the RAM 203 is used also as a main memory and a work memory of the CPU 201. For example, the RAM 203 functions as a reception buffer for temporarily saving firmware update information received from the server 300. The ROM 202 stores fixed data such as control programs configured to be executed by the CPU 201, a data table, and an OS program. In the present embodiment, each of the control programs stored in the ROM 202 performs software execution control such as scheduling, task switching, and interruption processing under management of the embedded OS stored in the ROM 202. Moreover, the ROM 202 is provided with a memory area configured to store data such as management data of the communication apparatus 200 that needs to be held also in the case where the power is not supplied. The CPU 201 is a system control unit, and integrally controls the entire communication apparatus 200.

The print engine 209 forms an image on a printing medium such as paper by using a printing material such as ink based on information saved in the RAM 203 or a print job received via the communication control unit 205, and outputs a print result. The input interface 206 is an interface for receiving a data input or an operation instruction from a user, and is formed of, for example, a physical keyboard, a button, a touch panel, or the like. Note that the configuration may be such that the input interface 206 and the output interface 207 to be explained later are an identical configuration, and the identical configuration performs an output of a screen and the reception of the operation from the user. The output interface 207 is an interface for display control that causes the display unit 208 to display data or a state of the communication apparatus 200. The display unit 208 is formed of, for example, a light emitting diode (LED) or a liquid crystal display (LCD), and displays data or the state of the communication apparatus 200. Note that the configuration may be such that a software keyboard including keys such as a numeral input key, a mode setting key, a determination key, a cancel key, or a power supply key is formed on the display unit 208, and an input from the user is received via the display unit 208.

The non-volatile memory 204 is formed of a device such as, for example, an electrically erasable programmable read-only memory (EEPROM) or a flash memory. For example, the non-volatile memory 204 saves data such as setting values of the communication apparatus 200 that needs to be held also in the case where the power of the communication apparatus 200 is not supplied.

The power supply control unit 210 controls a power supply state inside the communication apparatus 200. For example, in the case where the CPU 201 notifies the power supply control unit 210 of reception of an operation (hereinafter, also referred to as power supply operation) performed on a power supply button by the user, the power supply control unit 210 performs control of changing the power supply state of the communication apparatus 200 according to this power supply operation. Specifically, the power supply control unit 210 performs control of changing the power supply state from a normal active state to a power-off (soft-off) state or from the power-off state to the normal active state, based on the power supply operation performed by the user. The power-off state is a state in which a power supply plug is inserted into a power supply socket but the communication apparatus 200 is not activated. Note that the power supply state of the communication apparatus 200 is not limited to these states, and may include a standby state (sleep state) that is a state in which power consumption is smaller than that in the normal active state but is larger than that in soft-off state. In other words, the power supply control unit 210 can change the communication apparatus 200 to states varying in power consumption. Furthermore, in the case where the power supply plug is pulled out from the power supply socket and the communication apparatus 200 is cut off from a commercial power supply, the communication apparatus 200 is in a hard-off state (state where no power is supplied to each of the configurations of the communication apparatus 200). The communication apparatus 200 is not limited to the block configuration illustrated in FIG. 2, and may include other blocks as appropriate. For example, a memory such as an external HDD or an SD card may be formed in the communication apparatus 200 as an optional device, and information saved in the communication apparatus 200 may be saved in this memory.

Figure 3:
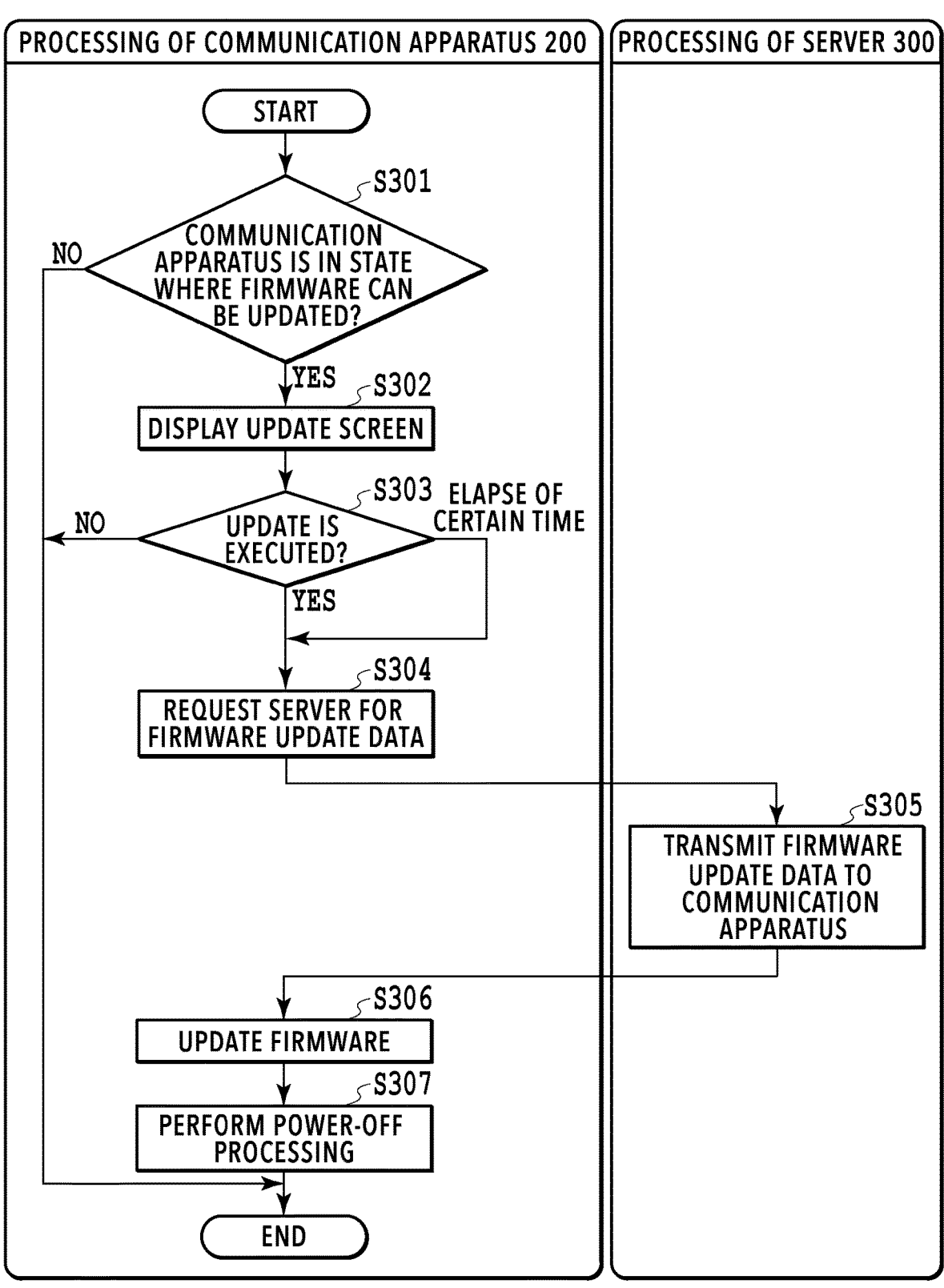
FIG. 3 is a flowchart of firmware update in the communication apparatus.

FIG. 3 is a flowchart illustrating processing in the case where a firmware update notification timing set in the communication apparatus 200 is detected. The CPU 201 of the communication apparatus 200 implements the present processing by loading a program stored in the ROM 202 to the RAM 203 and executing the program. Moreover, the present processing is started in the case where the CPU 201 of the communication apparatus 200 detects the firmware update notification timing at a set timing. Furthermore, "S" in explanation of each of the following processes means step in the flowchart, and the same applies to the following embodiments. Note that setting of the firmware update notification timing is described later in FIG. 5.

First, in S301, the CPU 201 of the communication apparatus 200 determines whether the communication apparatus 200 is in a state where firmware can be updated. In this case, a condition in which the communication apparatus 200 is in a state where it can receive update data from the server 300 is set as one of conditions for determining whether the communication apparatus 200 is in the state where the firmware can be updated. The communication apparatus 200 being in the state where it can receive the update data from the server 300 is, for example, a state where a free space of the RAM 203 in the communication apparatus 200 is equal to or more than a certain value. In a small free space state in which the free space of the RAM 203 is less than the certain value, reception of the update data cannot be completed. Accordingly, for example, the state where the free space is equal to or more than the certain value is set as the state where the communication apparatus 20 can receive the update data. Moreover, whether the communication apparatus 200 is in the state where it can receive the update data may be determined based on information that can be continuously collected by the CPU 201 from power-on.

Moreover, a condition in which data that should not be erased is not saved in a volatile memory is set as one of conditions for determining whether the communication apparatus 200 is in the state where the firmware can be updated. This is due to the following reason. In a configuration in which the communication apparatus 200 is restarted in the firmware update, there is a possibility that contents stored in the RAM 203 are erased in the firmware update. In the present embodiment, the CPU 201 determines whether the communication apparatus 200 is in the state where the firmware can be updated, based on the above-mentioned two conditions. Note that the conditions of the determination of S301 are not limited to the above-mentioned two conditions, and the determination may be performed based on other conditions. For example, a connection status of other apparatuses to the communication apparatus 200 or an execution status of jobs may be used as the conditions. In the case where the communication apparatus 200 determines YES (communication apparatus 200 is in the state where the firmware can be updated) in S301, the CPU 201 proceeds to S302. Meanwhile, in the case where the communication apparatus 200 determines NO (communication apparatus 200 is not in the state where the firmware can be updated), the CPU 201 terminates the processing of the present flowchart.

In S302, the CPU 201 displays a firmware update screen on the display unit 208.

Figure 4:
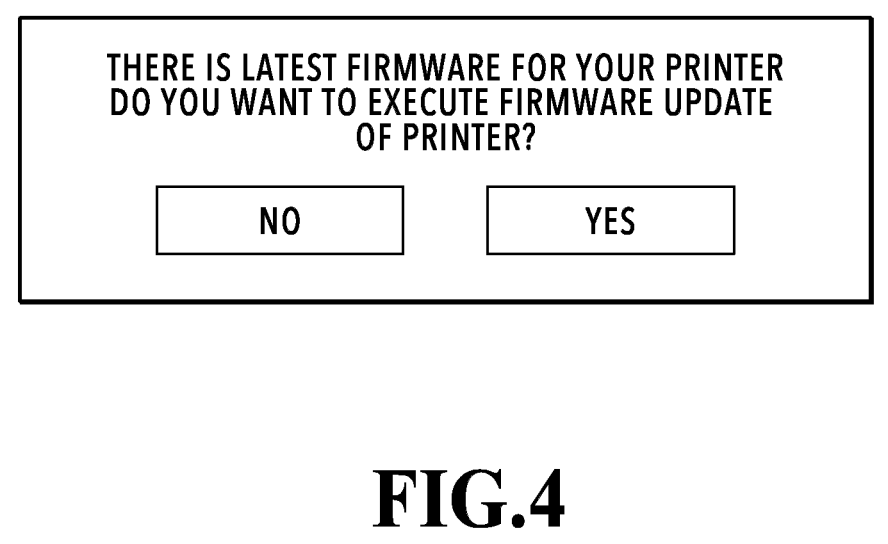

FIG. 4 is a diagram illustrating an example of the firmware update screen. As illustrated in FIG. 4, a message indicating presence of the update data of latest firmware and buttons (items) capable of receiving an instruction on whether the update of the firmware is to be performed or not are displayed on the firmware update screen. In this case, the CPU 201 performs monitoring of elapse of certain time by activating a monitoring timer, in addition to the display of the firmware update screen.

In S303, the CPU 201 determines which one of an instruction to perform the update of the firmware and an instruction to cancel the update is received on the firmware update screen. In the case where the instruction to cancel the update of the firmware (for example, "no" button in FIG. 4) is received, the CPU 201 terminates the processing of the present flowchart. Then, the CPU 201 displays a screen displayed before the display of the firmware update screen, on the display unit of the communication apparatus 200. Meanwhile, in the case where an instruction to perform the update of the firmware (for example, "yes" button in FIG. 4) is received, the CPU 201 proceeds to S304. The CPU 201 proceeds to S304 also in the case where the instruction to perform the update of the firmware is not received and a predetermined time in the monitoring timer elapses (specifically, time out). The case where time out occurs in S303 and the CPU 201 proceeds to S304 corresponds to, for example, the case where the firmware update screen is displayed in S302 but the user did not recognize (notice) the firmware update screen. In the present embodiment, in the case where the predetermined time elapses after the display of the firmware update screen, the update of the firmware is executed and then the power off is executed. Note that, in a mode in which the communication apparatus 200 includes a physical button (button such as a home button that transitions the display unit to a home menu screen), in the present embodiment, pressing of the physical button is disabled in the firmware update screen of FIG. 4 even if, for example, the user presses the physical button. Specifically, in the present embodiment, operations other than operations relating to the firmware update screen are not received, and the display unit does not transition to other screens until the pressing of the "no" button is received. However, the present embodiment is not limited to such a mode. For example, there may be a mode in which, in the case where the home button that is the physical button included in the communication apparatus 200 is pressed during the display of the firmware update screen, the menu screen is displayed without execution of the processing of firmware update.

In S304, the CPU 201 requests the server 300 for the update data of latest firmware. In S304, identification information such as a model name of the communication apparatus 200 is transmitted to the server 300 together with the request for update data. In S305, the server 300 transmits the update data corresponding to the communication apparatus 200, to the communication apparatus 200. Note that the server 300 may perform authentication of the communication apparatus 200 before the transmission of the update data to the communication apparatus 200. Moreover, the server 300 may encode the update data before the transmission of the update data to the communication apparatus 200. In this case, the CPU 201 of the communication apparatus 200 decodes the received update data.

In S306, the CPU 201 of the communication apparatus 200 receives (downloads) the update data transmitted from the server 300 in S305, and starts the update of firmware. In S306, the CPU 201 may determine whether the received update data is the update data corresponding to the communication apparatus 200. In this case, if the CPU 201 determines that the received update data is not the update data corresponding to the communication apparatus 200, the CPU 201 may delete the received update data, and terminate the processing of FIG. 3.

After start of execution of the firmware update, the CPU 201 stores information indicating the execution of the firmware update and a result of this execution (for example, successful or failed) in the non-volatile memory 204. Then, the CPU 201 proceeds to S307, and executes power-off processing. Next, the CPU 201 terminates the processing of the present flowchart.

Figure 5:
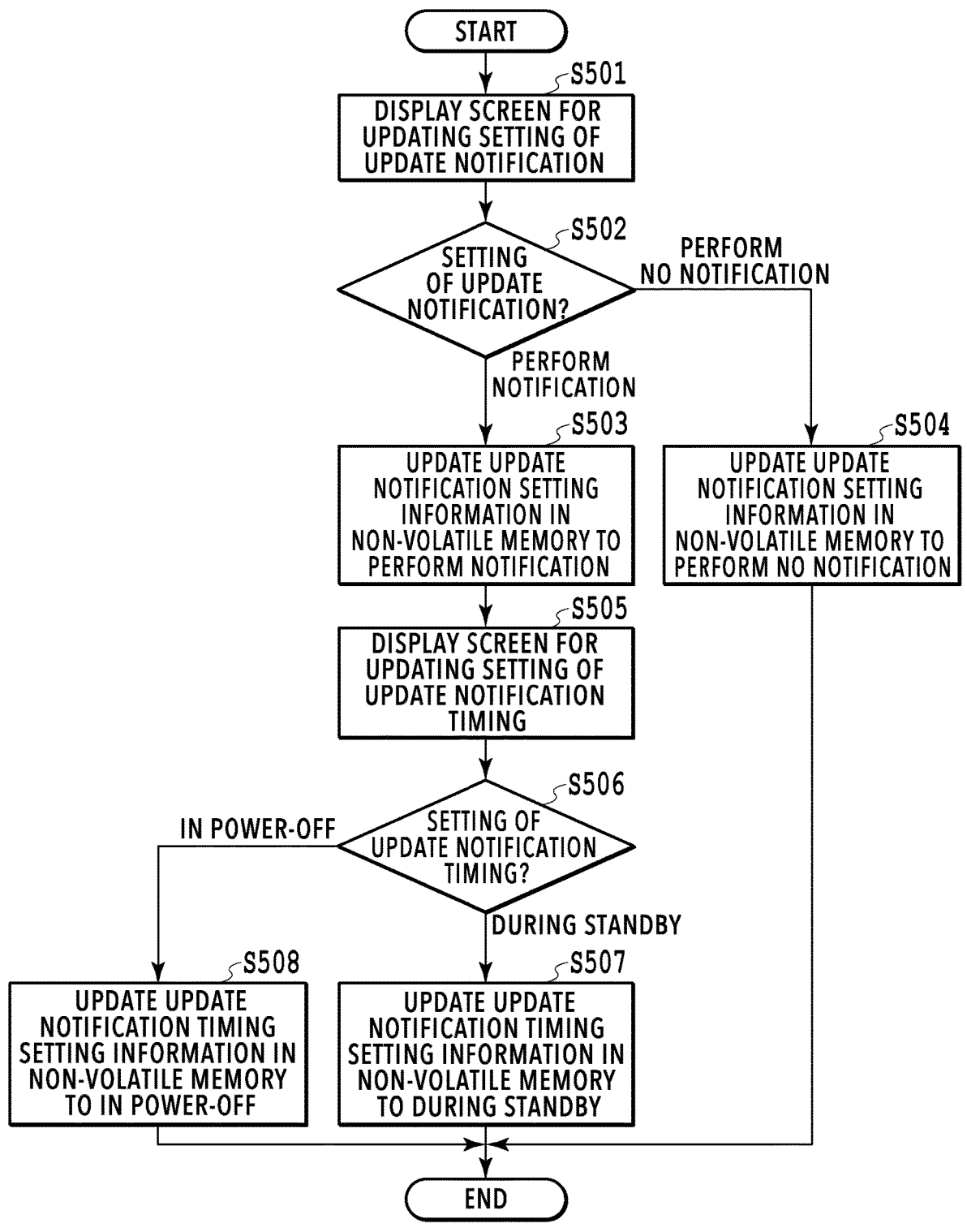
FIG. 5 is a flowchart in firmware update setting change in the communication apparatus.

FIG. 5 is a flowchart illustrating processing of changing setting of firmware update notification. The CPU 201 of the communication apparatus 200 starts the present processing by detecting an operation for changing the setting of firmware update notification performed by an operation by the user on the output interface 207.

In S501, the CPU 201 of the communication apparatus 200 displays a screen for updating the setting of firmware update notification, on the display unit 208.

Figure 6:
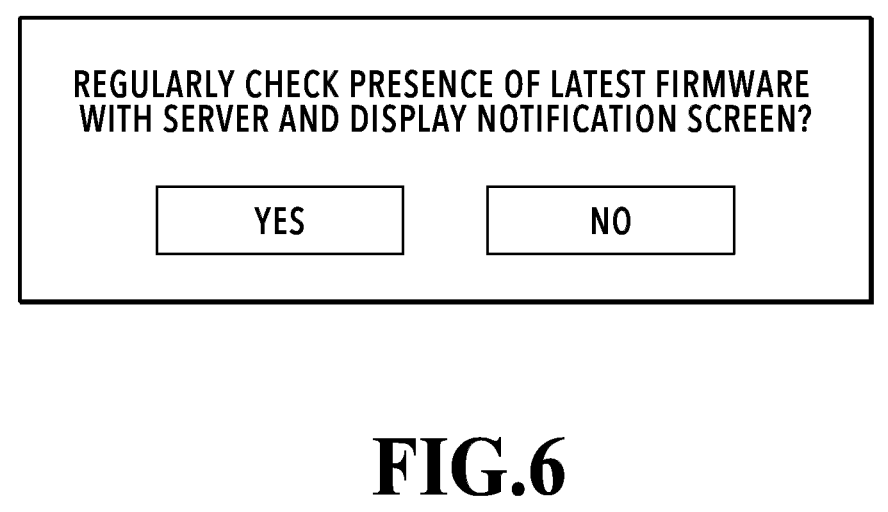

FIG. 6 is the screen for updating the setting of firmware update notification. In S502, the CPU 201 determines whether an instruction to notify the user of the update (for example, "yes" button of FIG. 6) is received in the update notification setting screen of the firmware update illustrated in FIG. 6. In the case where the instruction to notify the user of the update is received in S502, the CPU 201 proceeds to S503. Meanwhile, in the case where an instruction not to notify the user of the update is received in S502, the CPU 201 proceeds to S504.

In S504, the CPU 201 updates update notification setting information recorded in the non-volatile memory 204 to "perform no notification". Then, the CPU 201 terminates the processing of the present flowchart. In S503, the CPU 201 updates the update notification setting information recorded in the non-volatile memory 204 to "perform notification", and proceeds to S505. In S505, the CPU 201 displays a screen for updating the setting of the firmware update notification timing.

Figure 7:
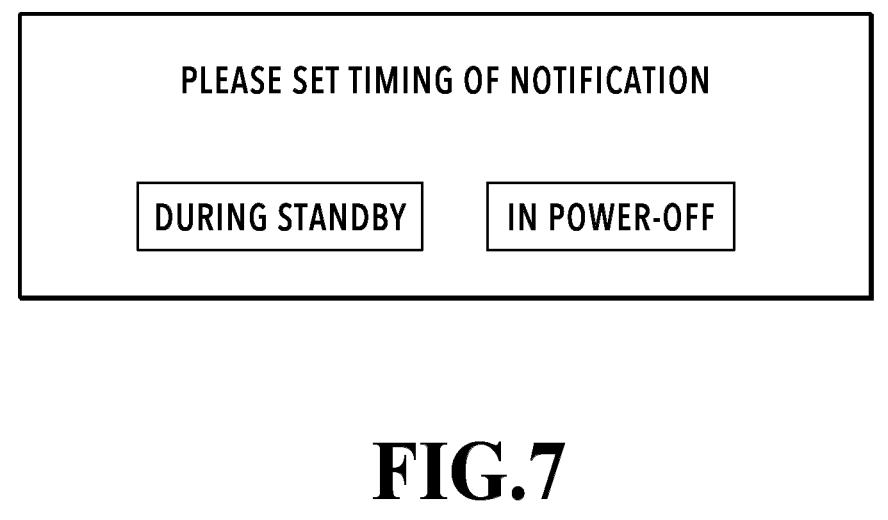

FIG. 7 is a diagram illustrating the screen for updating the setting of the firmware update notification timing. In S506, the CPU 201 determines which one of "during standby" and "in power-off" the notification timing of update is to be by receiving a user operation on the screen for updating the setting of the firmware update notification timing illustrated in FIG. 7. Note that "in power-off" is a timing in a period from reception of an execution command of the power-off processing on the communication apparatus 200 to transition of the communication apparatus 200 to the power-off state. The user can select one of a "during standby" button and an "in power-off" button in the confirmation screen illustrated in FIG. 7. In S506, in the case where the CPU 201 determines that the notification timing is "during standby", the CPU 201 proceeds to S507. Meanwhile, in the case where the CPU 201 determines that the notification timing is "in power-off" in S506, the CPU 201 proceeds to S508. In S507, the CPU 201 updates update notification timing setting information recorded in the non-volatile memory 204 to "during standby". Then, the CPU 201 terminates the processing of the present flowchart.

In S508, the CPU 201 updates the update notification timing setting information recorded in the non-volatile memory 204 to "in power-off". Then, the CPU 201 terminates the processing of the present flowchart. Note that the setting of the firmware update notification timing is not limited to such setting that one of the notification timings is enabled, and both notification timings may be simultaneously enabled.

As described above, in the present embodiment, after the detection of the set firmware update notification timing, the firmware update screen is displayed in the case where a predetermined condition is satisfied. In this case, the predetermined condition is a condition in which the update data of the latest firmware is in the server and the communication apparatus 200 is in a state where the firmware can be updated. Then, in the case where there is no instruction of performing the update of firmware from the user and the certain time elapses, the update of firmware is executed, and then the power-off is executed. Such a configuration can provide an opportunity in which the firmware can be update to the user. Detection of the power-off operation means that a possibility of the user not using the communication apparatus 200 for a while from the timing of this detection is high, and an effect of updating the firmware on the user can be assumed to be small. Moreover, the case where the communication apparatus 200 transitions to the standby state can be also assumed as the case where the user does not use the communication apparatus 200 for a while, and thus may be a favorable opportunity for performing the update of firmware. Accordingly, in the present embodiment, the opportunity in which the firmware can be updated can be provided to the user at a more suitable timing.

As described above, according to the present embodiment, it is possible to improve the opportunity of firmware update. Specifically, in the case where the certain time elapses after the display of the confirmation screen of the firmware update without an operation, the update of firmware is executed. This can prevent a situation where the firmware update is not executed in, for example, such a scene that the user does not recognize the display of the confirmation screen of the firmware update. Specifically, the present embodiment can provide more opportunities in which the firmware can be updated to the user.

Embodiment 2

In the present embodiment, as contents varying from Embodiment 1, information indicating that the power is turned off after the execution of the firmware update performed due to no operation being performed on the firmware update screen for the certain time is stored in the non-volatile memory 204. Moreover, firmware data before the update is stored in the non-volatile memory 204 of the communication apparatus 200. Then, in the next activation of the communication apparatus 200, whether the above-mentioned information is stored in the non-volatile memory 204 or not is determined. In the case where the above-mentioned information is determined to be stored, there is displayed a screen for confirming whether the executed firmware update is update intended by the user or not. In the case where the update is confirmed to be update unintended by the user in the confirmation screen, the current firmware is updated to the original firmware version by using the original firmware data saved in the non-volatile memory 204. This enables recovery from the firmware update unintended by the user. Details of the above-mentioned processing are explained below by using a flowchart.

Figure 8:
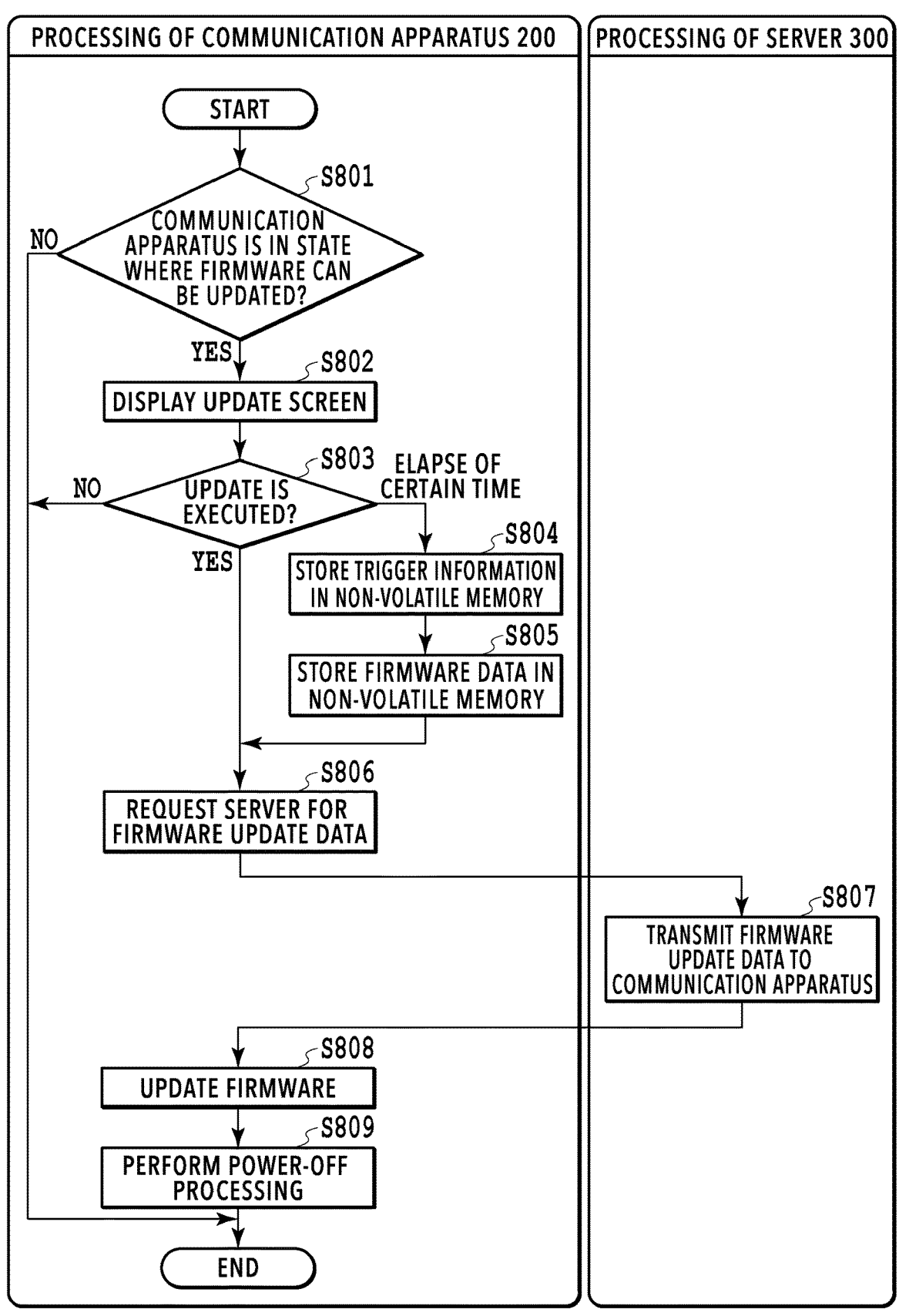
FIG. 8 is a flowchart in firmware update guidance in the communication apparatus.

FIG. 8 is a flowchart illustrating processing in the case where the firmware update notification timing set in the communication apparatus 200 is detected in the present embodiment. Since S801 to S802 and S806 to S609 are similar to the processing of S301 to S302 and S304 to S307 in FIG. 3, explanation is omitted.

In S803, in the case where the CPU 201 of the communication apparatus 200 receives no instruction of performing the update of firmware and the predetermined time elapses (specifically, time out) in the monitoring timer, the CPU 201 proceeds to S804. In S804, the CPU 201 stores information indicating that the user is not recognizing the firmware update screen, in the non-volatile memory 204. Then, in S805, the current firmware data is stored in the non-volatile memory 204. The information indicating that the user is not recognizing the firmware update screen is, in other words, trigger information that is a trigger of writing the firmware back to the original firmware at the next activation of the communication apparatus 200. Specifically, the configuration is such that the above-mentioned trigger information is stored in the non-volatile memory 204, and the CPU 201 refers to the non-volatile memory 204 in the next activation. This allows a recovery confirmation screen of the firmware to be displayed based on the fact that the trigger information is stored.

Figure 9:
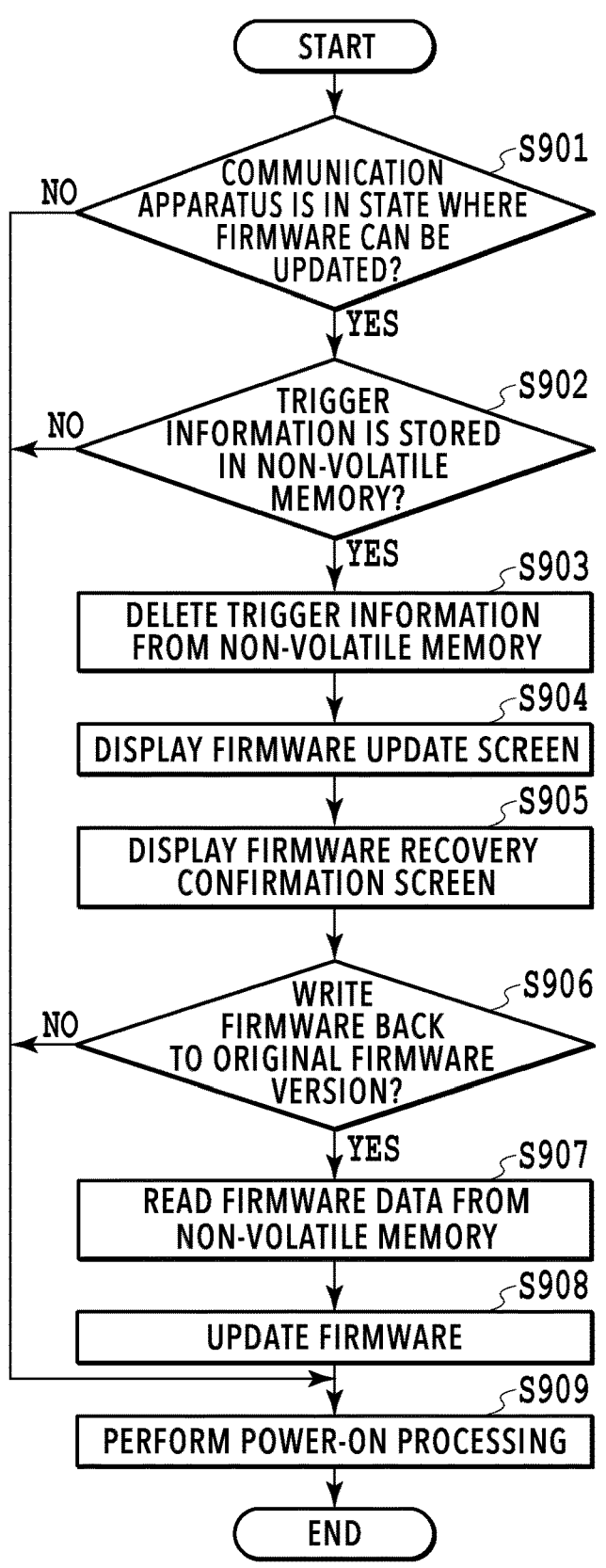
FIG. 9 is a flowchart in firmware recovery confirmation in the communication apparatus.

FIG. 9 is a flowchart illustrating processing in the case where power-on is executed by a user operation. Note that, although the case where the power-on is executed by the user operation is explained herein, the explanation may also apply to the case where the power-on operation is performed without the user operation. The present processing is started in the case where the power-on of the communication apparatus 200 is executed.

In the case where the power-on operation by the user is detected, in S901, the CPU 201 of the communication apparatus 200 determines whether the trigger information indicating that the user is not recognizing the firmware update screen is stored in the non-volatile memory 204 or not. In the case where the CPU 201 determines that the trigger information is stored in S901, the CPU 201 proceeds to S902. Meanwhile, in the case where the CPU 201 determines that the trigger information is not stored, the CPU 201 proceeds to S909.

In S902, the CPU 201 determines whether the communication apparatus 200 is in the state where the firmware can be updated, as in S301 of FIG. 3. In the case where the CPU 201 determines that the communication apparatus 200 is in the state where the firmware can be updated, the CPU 201 proceeds to S903. Meanwhile, in the case where the CPU 201 determines that the communication apparatus 200 is not in the state where the firmware can be updated, the CPU 201 proceeds to S909.

In S903, the CPU 201 deletes the trigger information from the non-volatile memory 204. In S904, the CPU 201 displays the firmware update screen on the display unit 208.

FIG. 10 is a display screen that gives notification of the update of the firmware. In the confirmation screen illustrated in FIG. 10, the CPU 201 activates the monitoring timer and performs monitoring of the elapse of the predetermined time in addition to the display of the firmware update screen. In the case where pressing of an OK button by the user is received or in the case where the predetermined time elapses without reception of the pressing of the OK button from the user, the CPU 201 terminates the display of the confirmation screen illustrated in FIG. 10, and proceeds to S905. In S905, the CPU 201 displays the recovery confirmation screen of the firmware.

Figure 11:
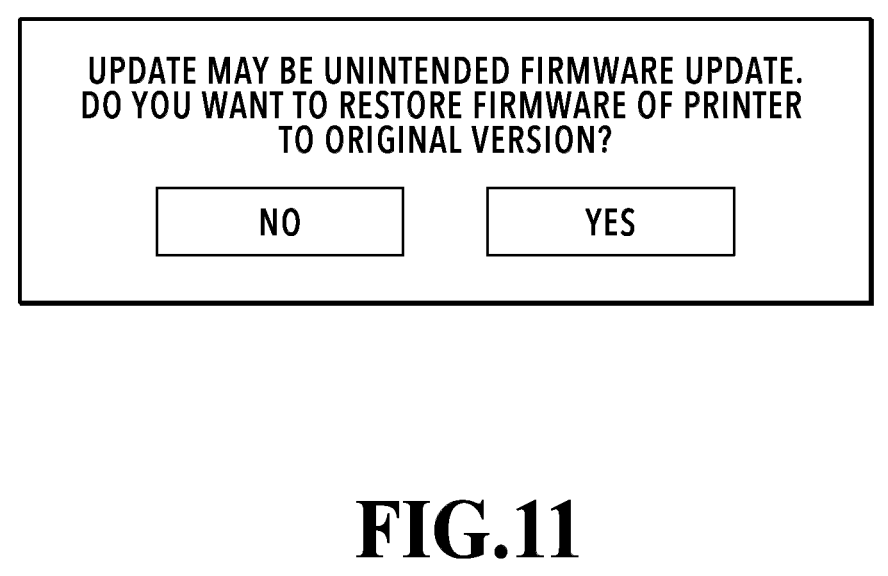

FIG. 11 is a diagram illustrating the recovery confirmation screen of the firmware. In the recovery confirmation screen illustrated in FIG. 11, the user determines whether the firmware update is update unintended by the user or not, and selects one of "yes" and "no". In S906, the CPU 201 determines whether to restore the firmware to the original version. The present processing is performed based on a user operation in the recovery confirmation screen illustrated in FIG. 11. In the case where an operation of "no" is received in the recovery confirmation screen, the CPU 201 determines NO, and proceeds to S909. Meanwhile, in the case where an operation of "yes" is received in the recovery confirmation screen, the CPU 201 determines YES, and proceeds to S907.

In S907, the CPU 201 loads the firmware data before update stored in the non-volatile memory 204 to the RAM 203. In S908, the CPU 201 executes the firmware update. Specifically, the CPU 201 executes processing of restoring the firmware to the original version. In S909, the CPU 201 executes the power-on processing. Then, the CPU 201 terminates the processing of the present flowchart.

As described above, according to the present embodiment, in the case where the certain time elapses in the firmware update screen and the firmware update is executed but is update processing unintended by the user, the firmware version can be restored. This enables restoring of the original firmware version in the case where the update of firmware is update unintended by the user, while securing the opportunity of firmware update.

Embodiment 3

In the present embodiment, the information indicating that the power is turned off after the execution of the firmware update performed due to no operation being performed on the firmware update screen for the certain time is stored in the non-volatile memory 204, and in addition the firmware data before update is transmitted to the server 300. This enables update to the original firmware version by obtaining the saved firmware data before update from the server 300 in the case where the executed update is update unintended by the user. Moreover, unlike Embodiment 2, since the firmware data before update can be obtained from the server, the firmware can be restored to the original version also in the case where the non-volatile memory 204 has no free space and the firmware data before update cannot be saved in the non-volatile memory 204. Details of the above-mentioned processing are explained below by using a flowchart.

Figure 12:
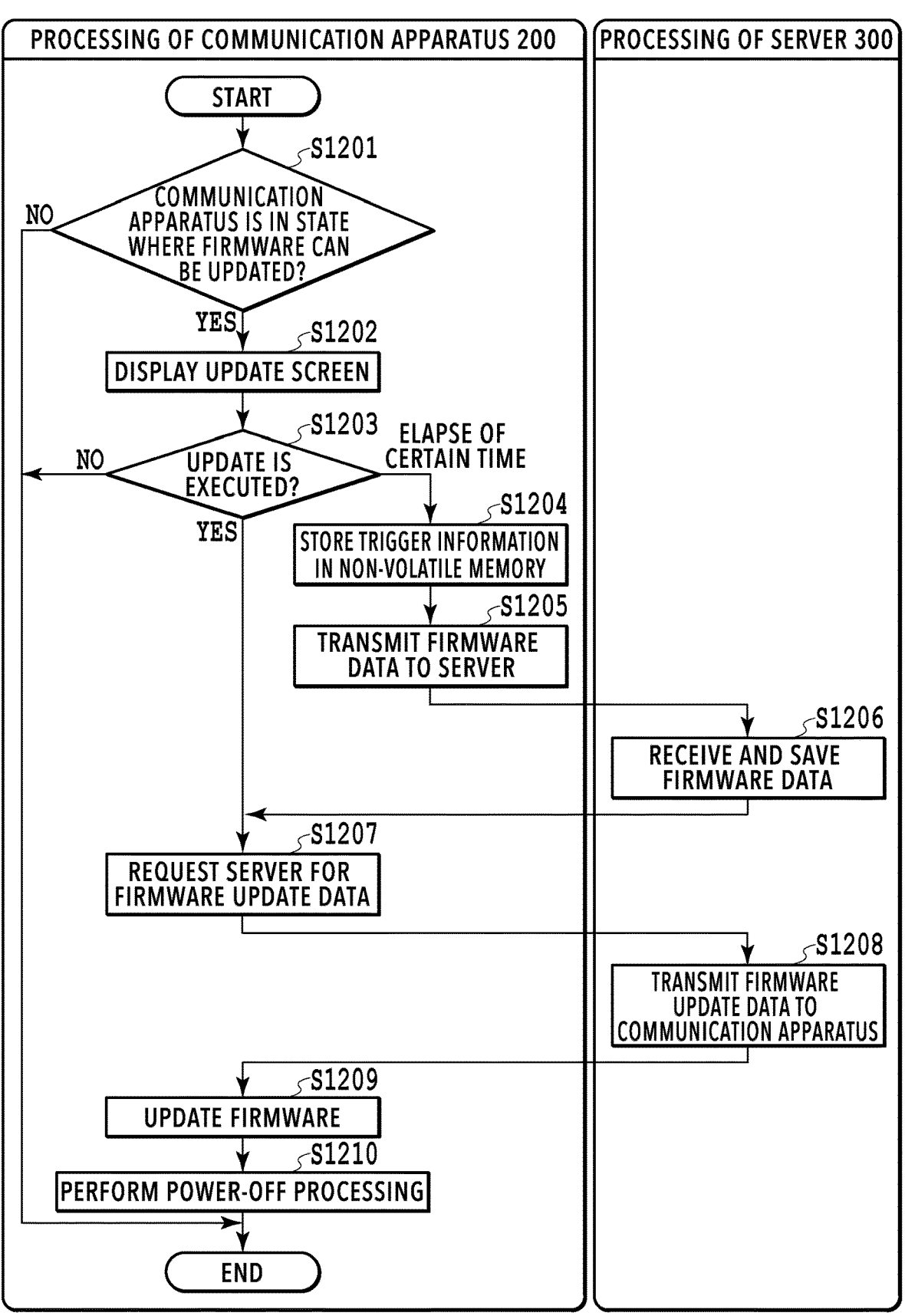
FIG. 12 is a flowchart in firmware update guidance in the communication apparatus.

FIG. 12 is a flowchart illustrating processing in the case where the firmware update notification timing set in the communication apparatus 200 is detected in the present embodiment. Note that, since S1201 to S1204 and S1207 to S1210 are similar to the processing in S801 to S804 and S806 to S809 in FIG. 8, explanation thereof is omitted.

In S1205, the CPU 201 transmits the current firmware data to the server 300. In S1206, the server 300 saves the received firmware data. This enables backup of the current firmware data for writing the firmware back to the original firmware version in the next activation of the communication apparatus 200.

Figure 13:
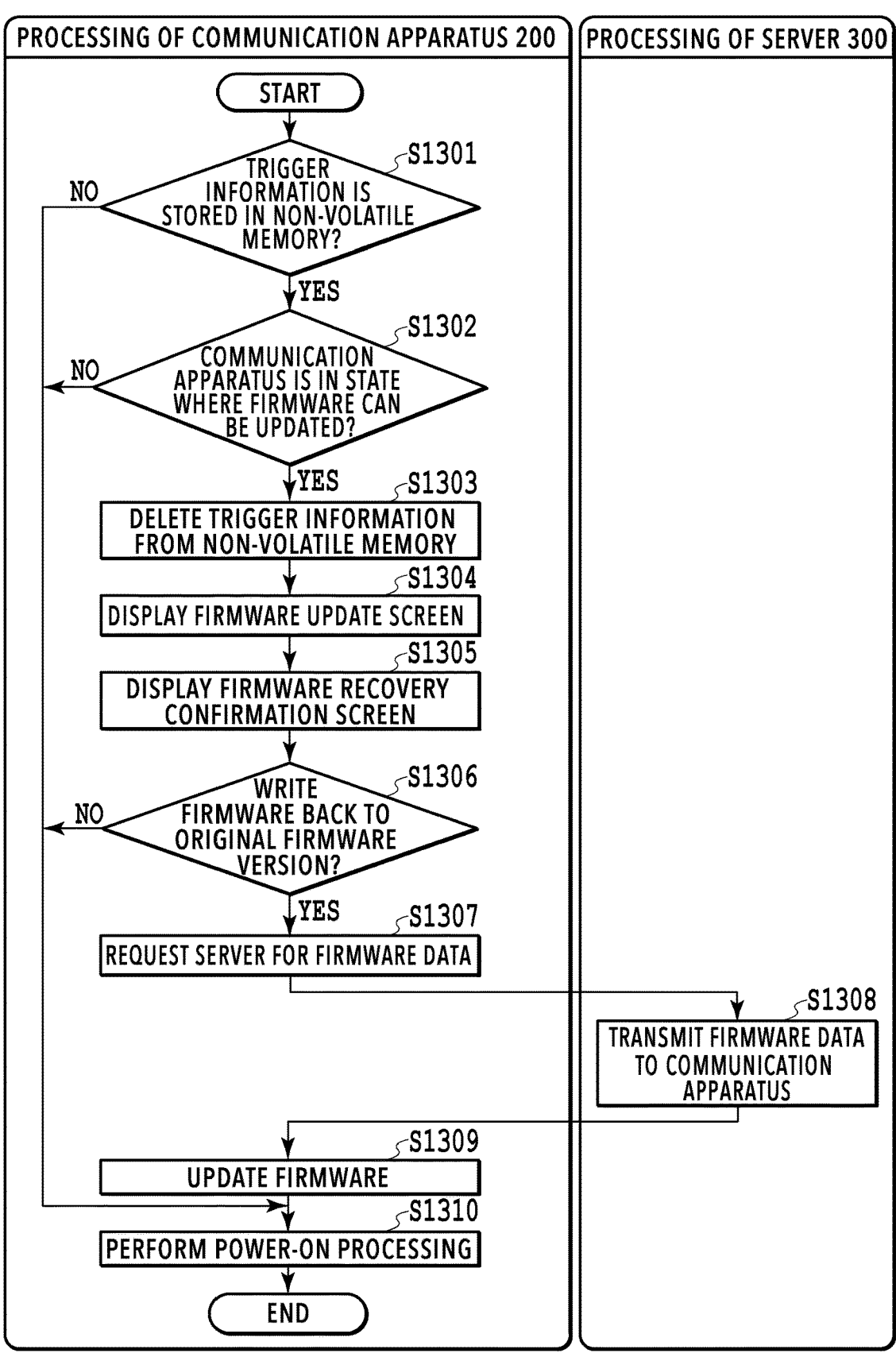
FIG. 13 is a flowchart in firmware recovery confirmation in the communication apparatus.

FIG. 13 is a flowchart illustrating processing in the case where the power-on is executed by a user operation. Since S1301 to S1306 and S1309 to S1310 are similar to the processing in S901 to S906 and S908 to S909 in FIG. 9, explanation thereof is omitted.

In S1307, the CPU 201 of the communication apparatus 200 requests the server 300 for the firmware data backed-up in the previous power-off of the communication apparatus 200. In S1308, the server 300 transmits the backed-up firmware data to the communication apparatus 200 in response to the firmware data request of the communication apparatus 200. The CPU 201 of the communication apparatus 200 executes the firmware update upon receiving the firmware data from the server 300.

This can secure the opportunity of firmware update also in the case where the free space of the non-volatile memory 204 in the communication apparatus 200 is not enough for the firmware data to be backed-up. Moreover, it is possible to restore the firmware to the original firmware version in the case where the update of firmware is update unintended by the user.

Other Embodiments

Although the current firmware data is saved in the non-volatile memory 204 or transmitted to the server 300 in the case where no operation is performed for the certain time in the update screen of firmware in FIGS. 8 and 12, the configuration is not limited to this. The current firmware data may be saved in the non-volatile memory 204 or transmitted to the server 300 also in the case where execution of the firmware update is instructed by a user operation in the update screen of firmware. This allows the firmware to be restored to the previous firmware version in the next power-on also in the case where the user performs the operation of firmware update as an erroneous operation or the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-061749, filed Apr. 5, 2023, which is hereby incorporated by reference wherein in its entirety.

What is claimed is:

1. A communication apparatus capable of communicating with a server, the communication apparatus comprising:

a display control unit configured to display a confirmation screen for receiving an operation on whether update of firmware of the communication apparatus is to be executed or not, on a display unit; and an execution unit configured to execute the update of the firmware of the communication apparatus by using firmware data that is used to update the firmware and that is provided from the server, in a case where a predetermined time elapses from display of the confirmation screen by the display control unit without reception of an instruction of the update of the firmware by a user, wherein the communication apparatus saves current firmware data in a non-volatile memory before execution of the update of the firmware using the firmware data, wherein the execution unit is capable of restoring the updated firmware to a version before the update of the firmware, after the execution of the update, by using the firmware data before the update saved in the non-volatile memory or the server, and wherein, after the update of the firmware is executed due to elapse of the predetermined time from the display of the confirmation screen, the display control unit displays a notification screen that provides notification of the firmware update, and in response to a second predetermined time elapsing from the display of the notification screen, the display control unit displays a recovery confirmation screen that receives an operation on whether the updated firmware is to be restored to the version before the update.

2. The communication apparatus according to claim 1, wherein, in a case where an operation of executing the update of the firmware is received before elapse of the predetermined time from the display of the confirmation screen by the display control unit, the execution unit executes the update of the firmware.

3. The communication apparatus according to claim 1, wherein, in a case where an operation of cancelling the update of the firmware is received before elapse of the predetermined time from the display of the confirmation screen by the display control unit, the execution unit determines not to execute the update of the firmware, and the display control unit displays a display screen that has been displayed before the display of the confirmation screen.

4. The communication apparatus according to claim 1, wherein, in a case where an operation other than an operation relating to the confirmation screen is performed on the communication apparatus during the display of the confirmation screen, the execution unit determines not to execute processing in response to the operation other than the operation relating to the confirmation screen, and the display control unit continues to display the confirmation screen.

5. The communication apparatus according to claim 1, wherein a timing at which the display control unit displays the confirmation screen is during standby or in power-off.

6. The communication apparatus according to claim 1, wherein the communication apparatus transmits current firmware data to the server before execution of the update of the firmware using the firmware data.

7. The communication apparatus according to claim 1, wherein the recovery confirmation screen is displayed in power-on of the communication apparatus performed after the execution of the update of the firmware.

8. The communication apparatus according to claim 1, wherein the communication apparatus is a printer including the display unit.

9. A control method of a communication apparatus capable of communicating with a server, the control method comprising:

displaying a confirmation screen for receiving an operation on whether update of firmware of the communication apparatus is to be executed or not, on a display unit; and executing the update of the firmware of the communication apparatus by using firmware data that is used to update the firmware and that is provided from the server, in a case where a predetermined time elapses from display of the confirmation screen in the displaying without reception of an instruction of the update of the firmware by a user;

saving current firmware data in a volatile memory before execution of the update of the firmware using the firmware data, wherein the communication apparatus is capable of restoring the updated firmware to a version before the update of the firmware, after the execution of the update, by using the firmware data before the update saved in the volatile memory or the server; and after the update of the firmware is executed due to elapse of the predetermined time from the display of the confirmation screen, displaying a notification screen that provides notification of the firmware update, and in response to a second predetermined time elapsing from the display of the notification screen, displaying a recovery confirmation screen that receives an operation on whether the updated firmware is to be restored to the version before the update.

10. A non-transitory computer readable storage medium storing a program which functions in a communication apparatus capable of communicating with a server and which causes the communication apparatus to function as:

a display control unit configured to display a confirmation screen for receiving an operation on whether update of firmware of the communication apparatus is to be executed or not, on a display unit; and an execution unit configured to execute the update of the firmware of the communication apparatus by using firmware data that is used to update the firmware and that is provided from the server, in a case where a predetermined time elapses from display of the confirmation screen by the display control unit without reception of an instruction of the update of the firmware by a user, wherein the communication apparatus saves current firmware data in a non-volatile memory before execution of the update of the firmware using the firmware data, wherein the execution unit is capable of restoring the updated firmware to a version before the update of the firmware, after the execution of the update, by using the firmware data before the update saved in the non-volatile memory or the server, and wherein, after the update of the firmware is executed due to elapse of the predetermined time from the display of the confirmation screen, the display control unit displays a notification screen that provides notification of the firmware update, and in response to a second predetermined time elapsing from the display of the notification screen, the display control unit displays a recovery confirmation screen that receives an operation on whether the updated firmware is to be restored to the version before the update.

* * * * *